Dec. 21, 1943.  R. T. CLOUD  2,337,231
NONDESTRUCTIVE TESTING METHOD AND APPARATUS
Filed Jan. 22, 1942  3 Sheets-Sheet 3

Inventor:
Raymond T. Cloud
By Paul F. Hawley
Patent Agent

_,__/,_J1

UNITED STATES PATENT OFFICE 2,337,231

NONDESTRUCTIVE TESTING METHOD AND APPARATUS

Raymond T. Cloud, Tulsa, Okla., assignor to Stanolind Oil and Gas Company, Tulsa, Okla., a corporation of Delaware Application January 22, 1942, Serial No. 427,722

9 Claims. (Cl. 175—183)

This invention pertains to the art of nondestructive testing of ferro-magnetic materials. More particularly it is concerned with the determination of the magnetic and mechanical properties of ferro-magnetic articles. One particular application of this invention has to do with the continual automatic testing of strips of ferro-magnetic material which may be in the form of bars, extruded shapes, tubes, etc.

In the past it has been customary in determining the mechanical properties of a ferro-magnetic material such as steel to detach a portion of the fabricated article and subject it to various tests from which the mechanical properties could be deduced. This, of course, necessitated the destruction of at least a portion of the fabricated article, while there was no certainty that the results of the test were fully applicable to sections of the article only a few inches removed. This is due to the well-known fact that the mechanical properties of these ferro-magnetic articles are to a great extent dependent upon the heat treatment and working to which these materials have been subjected and that as a result the mechanical properties can vary widely from point to point. With the advent of complicated shapes and the accelerated pace of manufacturing, it has become highly desirable to be able to make nondestructive tests of the material in such a fashion that the desired information about the fabricated article can be determined nondestructively in a rapid and convenient fashion. Only partial success has been experienced in the past with such investigations.

I have found that it is possible to obtain information about the mechanical characteristics of ferro-magnetic materials by an investigation of the magnetic properties of these materials. Since it is possible to subject a wide variety of shapes of ferro-magnetic articles to magnetic fields and since there is no appreciable change in the mechanical characteristics as a result of such subjugation it is apparent that this method is in a true sense nondestructive. It is therefore an object of this invention to provide a method and apparatus for the nondestructive testing of the mechanical properties of ferro-magnetic articles by a determination of one or more magnetic characteristics of this material. It is a further object of this invnetion to provide such a method and apparatus which can be easily arranged for entirely automatic operation, thus eliminating the need of any assistants, skilled or otherwise.

It is a further object of this invention to provide such a method and apparatus in which the depth of penetration of the test can be varied at the will of an operator so that it is possible to obtain a nondestructive test of the surface or the interior of the fabrication.

This invention is also applicable to the testing of ferro-magnetic materials used in electromagnetic equipment. For example, transformer steel must be manufactured under very careful supervision. At best it is difficult to secure the desired uniformity of the end product. By the employment of my invention it is possible to test nondestructively any sample of ferro-magnetic material and determine the magnetic properties of the material in a rapid and simple procedure. It is therefore an object of this invention to provide a method and apparatus for the determination of one or more magnetic properties of ferro-magnetic materials simply, expeditiously and if desired, automatically.

It is a further object of this invention to provide a method and apparatus for the magnetic testing of ferro-magnetic objects in which the testing is direct and there is no need for comparison of the tests on the object with those for a standard object. It is a further object of this invention to provide a method and apparatus of the character described in which a multiplicity of magnetic characteristics of the material being tested can be separately and simultaneously determined and in which a continuous visual record of each of these characteristics can be produced.

Other objects and advantages of this invention will be found in the following description and the appended drawings which form a part of this specification and are to be read in conjunction therewith. Although the invention has extremely wide application, for purposes of convenience in explaining the invention certain embodiments have been shown in the drawings. It is to be understood, however, that these embodiments are for the purpose of illustration and that the invention is not limited to the employment of the embodiment shown. In these figures the same reference numeral in different figures is used to indicate the same or analogous parts.

Figure 1:
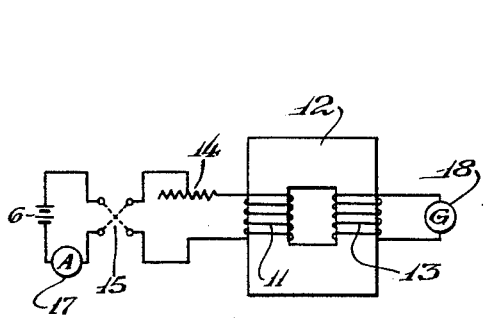
Figure 1 is a diagrammatic representation of a method of magnetic testing applied to a sample of ferro-magnetic material.

The basic phenomenon upon which the invention depends is that known as hysteresis. It is known that when a piece of ferro-magnetic material is magnetized with a cyclical variation in the magnetic field strength, that the resultant flux varies in a nonlinear fashion, and that this variation in flux is related to the magnetic properties of the particular object being investigated. The phenomenon can be demonstrated by use of the equipment shown in Figure 1. In this figure a coil 11, usually referred to as the "exciting coil" has been placed about a hollow ferro-magnetic core 12. A second or "pickup coil" 13 similarly encircles a portion of the core 12. The exciting coil 11 is connected through a rheostat 14 and a reversing switch 15 to a battery 16. An ammeter 17 is also connected in this series circuit. A ballistic galvanometer 18 is connected to the pickup coil. With the rheostat 14 set for full resistance the reversing switch 15 is closed in one direction, thus producing a certain magnetizing field strength in the exciting coil 11, the magnitude of which is a function of the product of the number of turns in the exciting coil and of the current flowing in the circuit, which is measured in the ammeter 17. This abrupt change in field strength from zero field to a definite field produces an abrupt change in the magnetic flux threading the core 12. This magnetic flux links the pickup coil 13, hence the change of flux generates in this coil a pulse of electromotive force which, in accordance with Faraday's law, is proportional to the total change in flux. This change is indicated by the maximum swing of the ballistic galvanometer 18. This deflection of the galvanometer and the corresponding reading of the meter 17 are recorded. The resistance of rheostat 14 is then abruptly decreased, thus increasing the current flowing in the exciting coil and the flux flowing through the core 12. This causes a second deflection of the ballistic galvanometer 18 which is proportional, again, to the change in flux through the pickup coil 13. This process is repeated until a certain desired maximum current flows through the exciting coil. The current through the exciting coil is then decreased in steps back to zero and for each change in current the corresponding galvanometer deflection is recorded. After the current has been decreased to zero the reversing switch 15 is thrown to the opposite position and the entire cycle is repeated.

Figure 2:
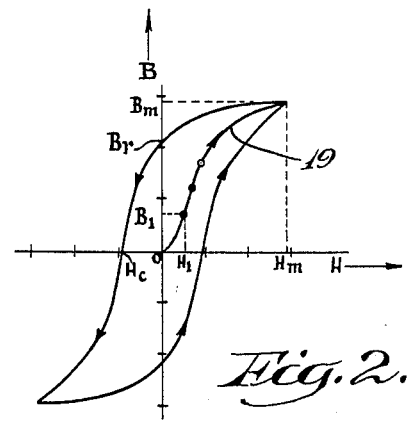
Figure 2 is a plot of the hysteresis curve obtained as a result of the employment of the apparatus shown in Figure 1.

After the data have been obtained it is customary to plot it on a diagram such as shown in Figure 2. Thus for example, it is customary to plot horizontally the magnetic field intensity expressed in oersteds or in ampere turns or the like and to plot at each value of the field strength the corresponding flux through the pickup coil 13. This latter is ascertained by calibrating the ballistic galvanometer in a manner well known in the art with a given number of turns in the pickup coil whereby the change in flux is obtained directly from the galvanometer deflection. The total changes in flux are added algebraically to determine the total flux in the core at any stage in the proceedings. The resultant diagram is known as a hysteresis curve or loop.

In Figure 2 the horizontal scale is in ampere turns and the vertical scale is in lines per square inch. Obviously, the first point on the plot will be for zero field intensity and for zero flux density so the point will be the origin. The field intensity is then increased to a value $H_1$ and from the galvanometer deflection and core area the corresponding magnetic flux density $B_1$ in lines per square inch is obtained. The values $H_1$ and $B_1$ define one point on the curve that is shown in Figure 2. The procedure is repeated throughout the entire cycle, resulting in the figure shown in Figure 2. The flux density for the maximum field strength $H_m$ employed is the value designated as $B_m$. It will be noted that as the field intensity is decreased there is a certain flux density at zero field. This value of flux density is designated in Figure 2 as $B_r$ and is known as the residual flux density. Actually this is the flux density which is due to the permanent magnetization of the ferro-magnetic material. It is necessary to apply a considerable negative field intensity in order to reduce the flux density to zero. By reference to Figure 2 it will be seen that this occurs at a value of field intensity $H_c$. This value is known as the "coercive force." Finally, it is noted that as the complete cycle of magnetization, and demagnetization is carried out a number of times that the same figure is produced each time with the exception of the first line of the plot indicated by numeral 19.

The three quantities which have been discussed above, namely, the maximum flux density $B_m$, the residual flux density $B_r$, and the coercive force $H_c$ are quantities which characterize the magnetic material involved, and vary in a significant fashion as the material is changed. Thus the maximum flux density which is obtained with a given field intensity is a measure of the amount of flux which can be induced in the material under a given condition of field intensity and hence determines the value of the material as the core of an electromagnet, transformer, or the like. The value of the residual flux density $B_r$ is an indication of the quality of the ferromagnetic material as a permanent magnet, since it indicates how strong a permanent magnetization can be induced in the ferro-magnetic material by the application of the maximum field intensity $H_m$. Finally, the demagnetization of the material is characterized by the coercive force $H_c$ since that determines how much reverse field intensity must be applied in order to demagnetize the material.

It can be shown that the area of the hysteresis loop is proportional to the energy required when the material is cyclically magnetized and demagnetized in the manner described above.

It is apparent from the above description that the three quantities $B_m$, $B_r$ and $H_c$ characterize the material which is being tested and thereby are an indication of the magnetic properties of this piece of material. In other words, it is not necessary to plot the complete hysteresis curve in order to obtain this information. I have found that from these quantities mechanical properties of the material may also be deduced. If a particular piece of material is heated or fabricated in such a way that parts of it are of different hardnesses, for example, the magnetic quantities discussed above will vary in a significant fashion. This is illustrated by Figure 3.

Figure 3:
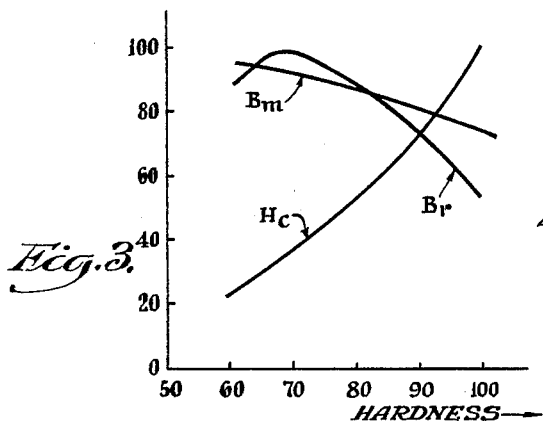
Figure 3 illustrates the correlation between certain magnetic properties of a specimen of ferro-magnetic material, and the hardness of the material.

Figure 3 is a plot of the variation of the maximum flux density, residual flux density, and the coercive force, of the same piece of ferro-magnetic material as a function of the hardness of this material. The hardness of the specimen was varied by heat treatment without varying the composition, and at each hardness the magnetic quantities $B_m$, $B_r$, and $H_c$ were measured. The hardness of the material is plotted horizontally and the variation in the magnetic quantities is plotted vertically on an arbitrary scale. It will be noted that the coercive force increases roughly in proportion to the hardness of the material, that the maximum flux density decreases as the hardness increases and finally, that with the exception of the region below a hardness of approximately 65 units, the residual flux density also decreases with increased hardness. It is apparent that, once having tested a particular composition of ferro-magnetic material to determine these three quantities, that they would uniquely determine the hardness of the material regardless of the heat treatment or fabrication which have been given to it. Similar correlations can be made between the magnetic properties of the material and other mechanical properties.

The magnetic quantities measured vary with the composition of the ferro-magnetic material being tested, but in general it is found that with any particular material the maximum flux density decreases and the coercive force increases as the hardness increases.

Figure 4:
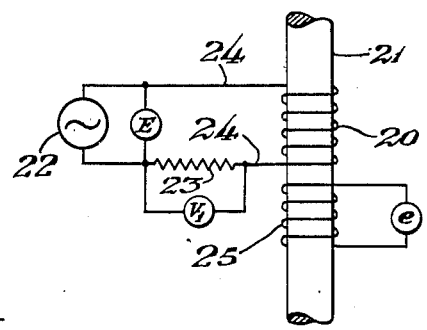
Figure 4 shows in diagrammatic form the basic equipment used in carrying out tests in accordance with this invention.
Figure 5:
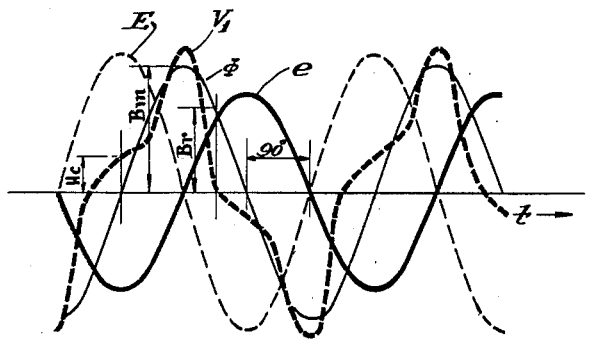
Figure 5 is a representation of an oscillograph showing certain electrical waves produced in the apparatus of Figure 4.

In Figure 4 I have shown the basic circuit by which the value of the coercive force, maximum flux density, and residual flux density of a sample of ferro-magnetic material are determined. In this particular figure an exciting coil 20 is coiled about a piece of ferro-magnetic material 21 which in the figure shown is in the form of a rod. This coil is energized with alternating current from an alternator 22 by means of conductors 24. In series with the exciting coil 20 and the alternator 22 is a relatively low resistance 23. The resistor 23 is chosen so that the inductive drop across the coil 20 is large compared to the resistive drop across resistor 23. Under this condition the resistance to flow of current in this circuit is nearly entirely the back electromotive force generated in the exciting coil 20 which is, of course, due to the change in flux linking this coil induced by the current flowing in the coil. The voltage output E of alternator 22 is sinusoidal, therefore the back electromotive force must also be sinusoidal. Since this back E. M. F. is proportional to the change of flux linking the exciting coil 20, these relationships can be represented by the equation $$E = K\frac{d\Phi}{dt} \quad (1)$$

where $\Phi$ is the flux through coil 20. E is sinusoidal, hence the flux $\Phi$ through the exciting coil and the rod 21 must likewise be sinusoidal. The time relationship of these quantities is shown in Figure 5 by the curves E and $\Phi$.

By reference to Figure 2 it is apparent that in order to obtain a sinusoidal variation in flux or flux density, the field intensity and hence, the current, flowing through the exciting coil cannot be sinusoidal. This can be further demonstrated on the oscillogram of Figure 5.

Since the drop across resistor 23 is in phase with the current through this resistor it follows that if an oscillograph element $V_1$ is placed across this resistor, an E. M. F. of the same wave form as the exciting current flowing through resistance 23 will be produced. The heavy dashed line in Figure 5 labeled $V_1$ thus represents the exciting current in coil 20.

A second or pickup coil 25 also encircles the ferro-magnetic material 21. A voltage $e$ is induced in this coil due to the alternating flux which threads it. This voltage $e$ will be given by the expression $$e = K\frac{d\Phi}{dt} \quad (2)$$

where $\Phi$ is the flux in rod 21.

If an oscilligraph element $e$ is connected across the pickup coil 25 the voltage that is generated will vary with relationship to the impressed voltage E on coil 20 in a manner shown by the heavy solid line in Figure 5.

It is apparent from an inspection of Figure 5, or the equation just above that the voltage in the pickup coil 25 lags behind the sinusoidal flux wave by a matter of 90 electrical degrees. It is thus substantially 180 electrical degrees out of phase with the alternator voltage E.

The flux wave can be represented by $$\Phi = B_m A \sin wt \quad (3)$$

where $B_m$ is the maximum flux density, A is the area of the rod and $w$ is $2\pi$ times the frequency of the alternator. Since the secondary voltage $e$ is given by Equation 2 above, it follows that $$e = KAB_m \cos wt \quad (4)$$

The maximum value of the voltage in the pickup coil 25 is therefore directly proportional to the maximum value of the flux density $B_m$.

Figure 6:
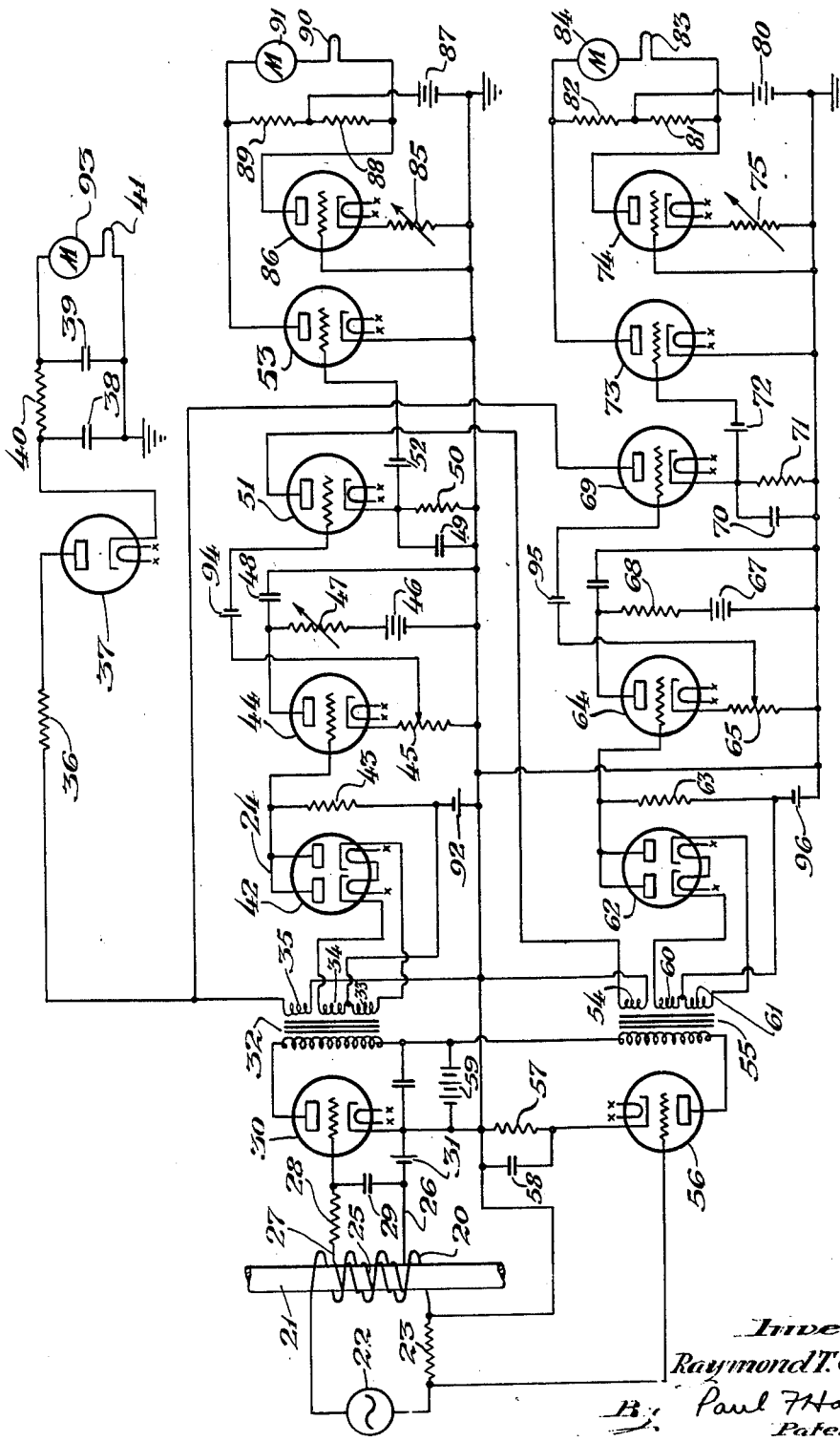
Figure 6 is a circuit diagram of a preferred embodiment of the invention.

The values of $B_m$, $B_r$ and $H_c$ are shown in the curves given in Figure 5. However, it is quite inconvenient to obtain these values from such oscillograms. For rapid or continuous testing it is essential to obtain these values as steady-state values rather than instantaneous values. Suitable apparatus for accomplishing this result is shown in Figure 6.

In this figure the exciting coil 20 and the pickup coil 25 have been placed together around the sample of material 21, which is tested. The exciting coil 20 is supplied with sinusoidal voltage by the alternator 22 to which is connected in series the low resistance 23, in the same manner shown in Figure 4. By means of this arrangement of apparatus a sinusoidal flux wave is generated in the specimen to be tested and an alternating E. M. F. appears across lines 26 and 27. A high resistance 28 and a condenser 29 are connected in series across the lines 26 and 27 with the relative values of the resistance and condenser chosen so that the impedance of the condenser at alternator frequency is of the order of approximately 2% of the resistance of resistor 28. Because of this arrangement, the voltage drop across resistance 28 leads the voltage across conductors 26 and 27 by approximately 90 electrical degrees. By reference to Figure 5 it is seen that this phase shifting operation places the voltage across the condenser 29 in phase with the flux wave $\Phi$. The voltage across condenser 29 is applied between the cathode and the grid of an amplifying vacuum tube 30 which is supplied with a suitable grid bias, for example, by means of battery 31. The plate of this tube is connected to the primary of a transformer 32, which has three secondary windings 33, 34 and 35. Each of the three secondary windings of transformer 32 has a voltage impressed across it which is in phase with the alternating flux flowing through the rod 21 and directly related in magnitude to the magnitude of this flux wave. The filament of the triode 30 is connected at points $x$—$x$ to a suitable source of potential in a manner well known in this art. One side of the winding 35 of transformer 32 is grounded. The other side of this winding 35 is connected through a resistor 36 to a diode 37 which serves to rectify the voltage output of winding 35. This rectified voltage is filtered by condensers 38 and 39 and resistor 40. Across the condenser 39 is connected a means for obtaining a visual indication of the voltage drop across condenser 39. This may be, as shown in Figure 6, a galvanometer element 41, or a meter 93 if desired. This apparatus is essentially a peak voltmeter operating an a voltage which is directly proportional to the flux wave through the sample 21. It is apparent that the deflection of the galvanometer element 41 is directly proportional to the maximum value of the flux threading the sample 21 and hence it is an indication of the $B_m$ in the particular sample under test.

The two windings 33 and 34 of the transformer 32 are connected in push-pull relationship to the cathodes of duodiode 42, the plates of which are connected together by means of conductor 24 and are connected to the grid of Thyratron tube 44 also to one end of resistor 43.

The potential drop across resistance 43 serves as a grid bias for Thyratron tube 44, the cathode of which is connected to ground through potentiometer 45. The plate of Thyratron tube 44 is connected to one side of condenser 48 and one end of variable resistor 47, the other end of which is connected to the positive pole of battery 46.

The movable arm of potentiometer 45 is connected to the grid of vacuum tube 51, the cathode of which is connected to ground through an integrating circuit composed of condenser 49 and resistor 50. The high or positive side of the integrating combination 49 and 50 is connected through a bias battery 52 to the grid of vacuum tube 53. The plate supply of tube 51 is obtained from winding 54 on one secondary of a transformer 55 which is similar to transformer 32. The plate supply of vacuum tube 53 is obtained from battery 87 through resistor 89, which together with meter 91 and recording meter element 90 constitute a tube voltmeter. Vacuum tube 86 which also receives its plate supply from battery 87 through resistor 88, and has its cathode connected to ground through variable resistor 85, is used for bucking out the residual plate current of vacuum tube 53 and for making comparison measurements as will be further described.

The drop of potential across the resistance 23, i. e., the voltage drop proportional to the energizing current in coil 20 which is therefore proportional to the magnetic induction in the sample 21, is applied between the cathode and grid of a vacuum tube 56. This tube is supplied with a cathode biasing resistor 57 and a bypass condenser 58. However, a bias battery may be used if desired. The plate of the vacuum tube 56 is connected through the primary of the transformer 55 to the plate battery 59 which also supplies potential to vacuum tube 30. From this description it is apparent that the voltage impressed across the winding 54 is an amplified reproduction of the wave of field intensity in the specimen 21 being tested.

As long as potential is applied across windings 33 and 34, there will be a resultant current through resistor 43 and hence a negative bias upon the grid of Thyratron tube 44. However, twice during each cycle there will be no voltage upon either winding 33 or 34 corresponding to the instants at which the 90 degree displaced wave corresponding to the flux wave through the specimen 21 crosses the zero axis. Therefore, at these instants the Thyratron tube 44 will be fired. Bias battery 92, being of such value as to permit this tube to fire only when no additional negative bias is received from duodiode 42. The variable resistance 47 in the plate circuit of Thyratron tube 44 is adjusted to such a value that will not sustain continuous current flow through the tube, the discharge being measured by the amount of charge on condenser 48. This insures that the time interval for which current flows is constant following each initiation pulse, and is time controlled by zero potential points on the secondary windings of transformer 32.

The pulses of current from Thyratron tube 44 flowing through cathode resistor 45 imposes positive pulses of potential on the grid of vacuum tube 51, which is normally biased to zero current by bias battery 94. These pulses of potential are of constant amplitude and time interval independent of all factors except the initiation time as described. However, by reference to Figure 5 it will be seen that at only one of the two instants during the cycle will the plate of tube 51 be positive with respect to the cathode. Accordingly, once each cycle at the instant that the grid of vacuum tube 44 is at approximately minimum potential, i. e., at the time when the flux flowing through specimen 21 is zero, a pulse of current will pass through the cathode circuit of vacuum tube 51 the magnitude of which is proportional to the value of the exciting current at that instant and hence is proportional to the value of the coercive force $H_c$. The integrating circuit in the cathode circuit of tube 51 serves to smooth out the pulsations so that the tube voltmeter tube 53 produces a steady deflection on the meter or galvanometer which is proportional to the value of the coercive force $H_c$.

Current flow through the meter 91 and galvanometer element 90 may be adjusted by means of variable resistor 85 which controls the bias and amount of current flowing through vacuum tube 86. Thus, if the meter is adjusted to indicate zero with no magnetic material in coil 20, all readings taken with magnetic materials in place will be proportional to the coercive force $H_c$ associated with said material, for the amount of maximum flux density $B_m$ used for the test:

In many cases it is desirable to make comparison tests where samples under test are to be compared with standard pieces possessing the required properties. In such cases it is only necessary to insert the standard piece into the exciting coil 20 and adjust bias resistor 85 until meter 91 reads zero, after which all readings taken with other samples in the coil will be proportional to deviations from the standard used for calibration. In such measurements a center type of meter is desirable.

Transformer 55 likewise has two identical secondary windings 60 and 61 connected in push-pull relationship to the cathodes of duodiode tube 62. As previously described, the potential appearing on the secondary windings of transformer 55 are proportional to the current flowing in the exciting coil 20 or to the magnetizing force. The circuit following transformer 55 operates in exactly the same manner as described for measuring the coercive force $H_c$, except in this case Thyratron tube 64 is tripped each time the magnetizing force in the exciting coil 20 passes through a zero value and the plate supply of vacuum tube 69 is taken from secondary winding 35 of transformer 32, the instantaneous potential of which is proportional to the magnetic flux in the sample under test.

Each time the magnetizing current passes through a zero value, Thyratron tube 64 is tripped producing a positive pulse of current on the grid of vacuum tube 69. On alternate pulses the instantaneous potential supplied to the plate of tube 69 by transformer winding 35 is positive and current flows to the integrating circuit composed of resistor 71 and condenser 70.

From transformer theory and reference to Figures 2 and 5 it can be readily seen that the potential appearing across condenser 70 and resistor 71 will be proportional to the residual flux or $B_r$ of the sample under test.

Vacuum tube voltmeter tube 73 and the balancing tube 74 operate exactly in the same manner as previously described for tubes 53 and 86 and the meter 84 and galvanometer element 83 can be adjusted to read proportional to $B_r$ or to values in comparison to a standard reference sample.

From the above discussion it is seen that galvanometer element 41 produces a steady deflection which is proportional to the maximum flux density, $B_m$, of the section being tested. The galvanometer element 90 produces a steady deflection which is proportional to the value of the coercive force, $H_c$, of the section of the sample being tested, while galvanometer 83 produces a steady deflection proportional to the residual flux density, $B_r$, in this section.

It is of course understood that what is actually being measured is the total flux in the sample and that the proportionality existing between the flux and the flux densities $B_m$ and $B_r$ ceases to exist where there are changes in cross section in the material passing through the testing apparatus. In such cases correction factors must be applied to compare sections of different cross section.

In order to measure the magnetic quantities discussed above with relation to various sections of the sample 21 it is merely necessary to move this sample with respect to the two coils 20 and 25. If the material is in a rod or similarly elongated structural form, it is sufficient to build these coils with large inside diameter so that the rod or other elongated shape can pass axially through the coil. If desired, an arrangement similar to that shown in Figure 7 can be used for the expeditious testing of long strips of materials.

Figure 7:
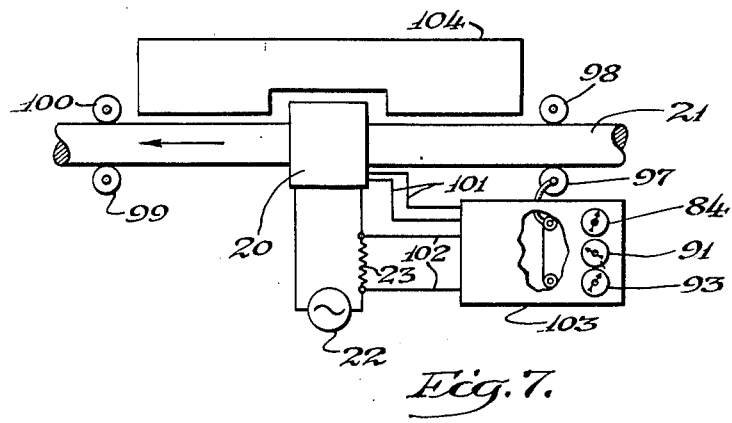
Figure 7 is a diagrammatic representation of a second embodiment of the invention.

In Figure 7 I have shown the sample 21 being carried by four sets of rollers 97, 98, 99, and 100, thereby passing through the two coils of which only the coil 20 can be seen, although the leads 101 from the coil 25 are apparent. The leads 101 and the leads 102 from the resistor 23 pass into the recording or indicating equipment indicated generally in unit 103. This unit can be provided with a strip of photographic film upon which the three magnetic quantities are galvanometrically recorded as a function of time or a function of the position of the material 21, or if desired the three magnetic quantities may be indicated on meters such as meters 84, 91, and 93 shown in Figure 7. If desired, of course, both a photographic strip record and visually indicating meters can be used simultaneously. In Figure 7 the strip of recording medium is moved by a take-up reel (not shown) geared to one of the rollers.

I have frequently found it convenient to employ a core 104 of ferro-magnetic material supported close to the specimen under test to form a low reluctance return path for the flux flowing through the specimen 21. Preferably, the reluctance of core 104 is considerably less than that of the piece 21 undergoing test. While this arrangement is not necessary it will be found that the use of such apparatus increases the sensitivity of the recording obtained in this test equipment.

One advantage in the use of this method of testing lies in the fact that it is capable of being utilized in an entirely automatic method. Therefore, for example, if strips, sheets, etc. of ferromagnetic material have been heat-treated and it is desired to eliminate such sections as do not have a certain magnetic or mechanical characteristic, it is merely necessary to add a relay equipment with an electromagnetically operated paint brush or the like which will produce a painted indication upon the strip of material passing by the coil when the characteristic changes markedly from that which is desired. Such types of marking equipments are well known in analogous arts and hence no further description is deemed warranted.

As long as the frequency employed in the magnetic testing of the material is low, i. e., of power frequency, there is little probability that there will be any of the cross section of the material being tested which is not affected by the magnetic flux. If, however, the frequency of the alternator 22 is raised, eventually the penetration of the flux into the specimen will be limited by the phenomenon known as the "skin effect." This effect becomes quite pronounced at frequencies of the order of several thousand cycles. It is apparent, therefore, that by the use of a relatively high frequency followed later by investigation at lower frequency it is possible to test magnetically first the surface of a piece of ferro-magnetic material and later the inner portions, using lower frequency. Convenient frequency ratios range from 5 to 1 up, the lower frequency being about 25 to 60 cycles.

Figure 8:
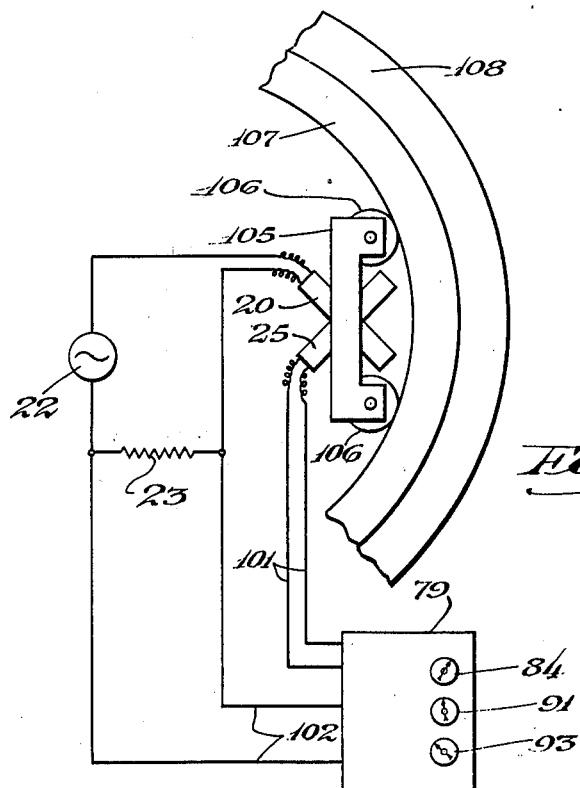
Figure 8 is a diagrammatic representation of a third embodiment of the invention by the use of which a variation in the depth of testing is obtained.

In Figure 8 the two coils 20 and 25, that is, the exciting and pickup coils, are shown mounted at right angles to each other on a carriage 105 provided with roller 106. In this figure the coils are adapted to be moved about the concave surface of a piece of curved ferro-magnetic material 107. This material may, for example, be a section of drill pipe or the like to which has been attached a pin joint 108. The source of alternating current, alternator 22, is arranged so that the frequency can be varied at will. The two coils are arranged at right angles so that they have the minimum coupling when they are not in the presence of magnetic material. However, when near magnetic material, as shown in Figure 8, the magnetic material serves as a coupling between the coils and a current flows in the pickup coil 25 in the same manner as that described in connection with Figures 6 and 7. In operation, the crossed coil assembly is inserted in the end of the drill pipe and a relatively high frequency, that is thousands of cycles, is applied through alternator 22. At these high frequencies the penetration of the alternating magnetic flux into the material is shallow, hence the major portion of this flux penetrates only into the member 107. Only a very small amount of flux penetrates into member 108. The readings of $B_m$, $B_r$, and $H_c$ are then made, as explained in connection with Figures 6 and 7. Readings are then made at a lower frequency or frequencies. As the magnetic penetration increases, there is usually an appreciable increase in $H_c$ and a decrease in $B_m$ since the pin joint 108 is normally much harder than the drill pipe 107 itself. The entire inner area of the drill pipe can be investigated very rapidly by mounting the drill pipe so that it can rotate about its axis while the coil assembly is passed longitudinally through the pipe. Variations in mechanical strength, even that which has not caused a microscopic crack can be detected easily by this arrangement, so that the drill pipe can be condemned long before there will be an opportunity for twist offs or other failures. Obviously, a similar set of crossed coils could be mounted on the outside of the drill pipe in order to investigate the outside simultaneously if desired.

The equipment of the type shown in Figure 8 can be satisfactorily adapted to test the condition of boilers or of boiler tubes. In this application it is apparent that the exploring coils can be employed to obtain the mechanical condition of the boiler long before any danger can arise and in places which would be inaccessible to visual inspection. Other arrangements of the exciter and pickup coils can be made to suit the situation at hand. There is no intent to be limited to the particular types of pickup coils described in the figures.

A simple way to correlate the magnetic readings with a mechanical property is to prepare test specimens of the same composition as the pieces later to be tested, but with differing values of the mechanical property to be investigated, which specimens are run through the magnetic testing equipment and the variation of the magnetic quantities measured as a function of the mechanical property. In the subsequent tests it is merely necessary to refer to the correlation chart to determine the value of the mechanical property of the piece then being tested.

In general, the method of operation might be summarized as (1) producing a cyclically varying flux wave in the ferro-magnetic material to be tested, producing an electrical signal in phase with this flux wave, producing a steady-state indication proportional to the peak value of the signal, (2) producing an electrical wave in phase with the magnetic field intensity which produced the cyclic flux wave, producing a pulse of current proportional to the value of the flux wave when the magnetic field intensity is zero, and producing a steady-state indication proportional to the average magnitude of this pulse, and (3) producing an electric pulse proportional to the magnitude of the magnetic field instensity when the flux is zero, and producing a steady-state indication proportional to the average magnitude of this last pulse. If desired, the indications are correlated with a mechanical property of the piece by reference to the indications produced using test specimens with varying values of the mechanical property.

It will be apparent from inspection of the figures that it is impossible to describe all possible variations of equipment which can be used to carry out the various parts of this procedure. Certain simple embodiments have been shown and described to illustrate the principles enumerated above. These are possibly the most basic arrangements of apparatus and they have certainly proved to be convenient as used in operations. The invention, however, is not to be limited to these embodiments but is best defined in the appended claims.

I claim:

1. A method of non-destructive testing of a ferro-magnetic article including the steps of inducing by electromagnetic means a substantially sinusoidally varying magnetic flux in at least a portion of said article, generating an electric wave proportional to the magnetic field strength of said electromagnetic means, producing an electric signal proportional to said magnetic flux in said article, producing a pulse of current proportional to the magnitude of said wave when said signal is of a predetermined amplitude while maintaining said current at substantially zero amplitude during the remainder of each cycle of said electric signal, producing a second current pulse proportional to the magnitude of said signal when said wave is of a predetermined amplitude while maintaining said second current at substantially zero amplitude during the remainder of each cycle of said wave, and producing separate visible indications of the average value of said current pulse and of said second current pulse.

2. A method of non-destructive testing of a ferro-magnetic article including the steps of inducing by electromagnetic means a substantially sinusoidally varying magnetic flux in at least a portion of said article, generating an electric wave proportional to the magnetic field strength of said electromagnetic means, producing an electric signal proportional to said magnetic flux in said article, rectifying separately said wave and said signal, producing a pulse of current proportional to the magnitude of said rectified wave when said signal is of approximately zero amplitude, producing a second current pulse proportional to the magnitude of said rectified signal when said wave is of approximately zero amplitude, and producing separate visible indications of the average value of said current pulse and of said second current pulse, whereby at least two magnetic properties of said portion of said article are indicated.

3. A method of non-destructive testing of a ferro-magnetic article including the steps of inducing by electromagnetic means a substantially sinusoidally varying magnetic flux in at least a portion of said article, generating an electric wave proportional to the magnetic field strength of said electromagnetic means, producing an electric signal proportional to said magnetic flux in said article, producing a unidirectional pulse of current proportional to the magnitude of said wave when said signal is of approximately zero amplitude, producing a second unidirectional current pulse proportional to the magnitude of said signal when said wave is of approximately zero amplitude, rectifying said signal, producing a third pulse of current proportional to the magnitude of said rectified signal, and producing separate visible indications of the average value of said current pulse, said second current pulse, and said third current pulse, whereby the values of the coercive force, residual flux density, and maximum flux density of said portion of said article are automatically indicated.

4. A method of non-destructive testing of a ferro-magnetic article including the steps of generating a magnetic field of cyclically varying intensity at a first frequency adjacent to a portion of said article, whereby a cyclically varying magnetic flux is induced in a portion of said article, producing an electric wave proportional to the intensity of said magnetic field, generating an electric signal proportional to said magnetic flux in said article, separately amplifying said wave and said signal, generating a unidirectional pulse of current proportional to the magnitude of said amplified wave when said signal is of substantially zero amplitude, generating a second unidirectional pulse of current proportional to the magnitude of said amplified signal when said wave is of substantially zero amplitude, generating a third unidirectional pulse of current proportional to the amplitude of said signal, producing separate steady-state indications proportional to the average value over the cycle of each of said current pulses, and repeating the above steps at at least one other frequency differing widely from said first frequency, whereby the average depth of investigation is changed.

5. A method of non-destructive testing of a ferro-magnetic article according to claim 4 in which testing is carried out at at least two frequencies one of which is in the range between 25 and 60 cycles per second and the other at least five times as great.

6. Apparatus for the non-destructive testing of a ferro-magnetic article comprising means including an exciting coil for inducing a substantially sinusoidally varying magnetic flux in at least a portion of said article, means for generating an electric wave proportional to the magnetic field strength of said inducing means, means including a pickup coil for producing an electric signal proportional to said magnetic flux in said article, means for generating a pulse of current proportional to the magnitude of said wave only when said signal is of a predetermined magnitude and for maintaining said current at substantially zero amplitude during the remainder of each cycle of said signal, means for generating a second current pulse proportional to the magnitude of said signal only when said wave is of a predetermined magnitude and for maintaining said second current at substantially zero amplitude during the remainder of each cycle of said wave, means responsive only to said current pulse for producing an indication of the average value of said current pulse and means separate from said last-mentioned means responsive only to said second current pulse for producing an indication of the average value of said second current pulse.

7. Apparatus for the non-destructive testing of a ferro-magnetic article comprising means including an exciting coil for inducing a substantially sinusoidally varying magnetic flux in at least a portion of said article, means for generating an electric wave proportional to the magnetic field strength of said inducing means, means including a pickup coil for producing an electric signal proportional to said magnetic flux in said article, means for generating a pulse of current proportional to the magnitude of said wave only when said signal is of approximately zero amplitude while maintaining said pulse of current at substantially zero amplitude during the remainder of each cycle of said signal, means for generating a second current pulse proportional to the magnitude of said signal only when said wave is of approximately zero amplitude while maintaining said second current pulse substantially at zero amplitude during the remainder of each cycle of said wave, means responsive solely to said pulse of current for producing an indication of the average value of said current pulse, and means responsive only to said second current pulse for producing an indication of the average value of said second current pulse during the cycle of variation of said magnetic flux, whereby steady-state indications of at least two magnetic properties of said portion of said article are produced.

8. Apparatus for the non-destructive testing of a ferro-magnetic article including a source of alternating current, a circuit connected to said source including an exciting coil disposed adjacent at least a portion of said article for inducing therein a cyclically varying magnetic flux, means for generating an electric wave proportional to the magnetic field strength of said exciting coil, means for generating an electric signal proportional to said magnetic flux in said portion of said article, a vacuum tube containing at least a cathode, plate, and grid, means for applying between cathode and plate of said vacuum tube a voltage proportional to said wave, means for applying to said grid a negative voltage the magnitude of which is proportional to the amplitude of said signal, means for producing a visible indication of the average value of the output of said vaccum tube, a second vacuum tube containing at least a cathode, plate and grid, means for applying between cathode and plate of said second vacuum tube a voltage proportional to said signal, means for applying to said grid of said second vacuum tube a negative voltage the magnitude of which is proportional to the amplitude of said wave, and means for producing a visible indication of the average value of the output of said second vacuum tube.

9. Apparatus for the non-destructive testing of a ferro-magnetic article including a source of alternating current, a circuit connected to said source including an exciting coil disposed adjacent at least a portion of said article for inducing therein a cyclically varying magnetic flux, means for generating an electric wave proportional to the magnetic field strength of said exciting coil, means for generating an electric signal proportional to said magnetic flux in said portion of said article, a vacuum tube containing at least a cathode, plate and grid, means for applying between cathode and plate of said vacuum tube a voltage proportional to said wave, means for applying to said grid a negative voltage the magnitude of which is proportional to the amplitude of said signal, means for producing a visible indication of the average value of the output of said vacuum tube, a second vacuum tube containing at least a cathode, plate and grid, means for applying between cathode and plate of said second vacuum tube a voltage proportional to said signal, means for applying to said grid of said second vacuum tube a negative voltage the magnitude of which is proportional to the amplitude of said wave, means for producing a visible indication of the average value of the output of said second vacuum tube, a rectifier, means for applying to said rectifier a voltage proportional to said signal, and means for producing a visible indication of the average value of the output of said rectifier, whereby values of three magnetic quantities characteristic of said portion of said article are obtained, from which mechanical characteristics of said portion of said article can be deduced.

RAYMOND T. CLOUD.